_United States Patent Office_

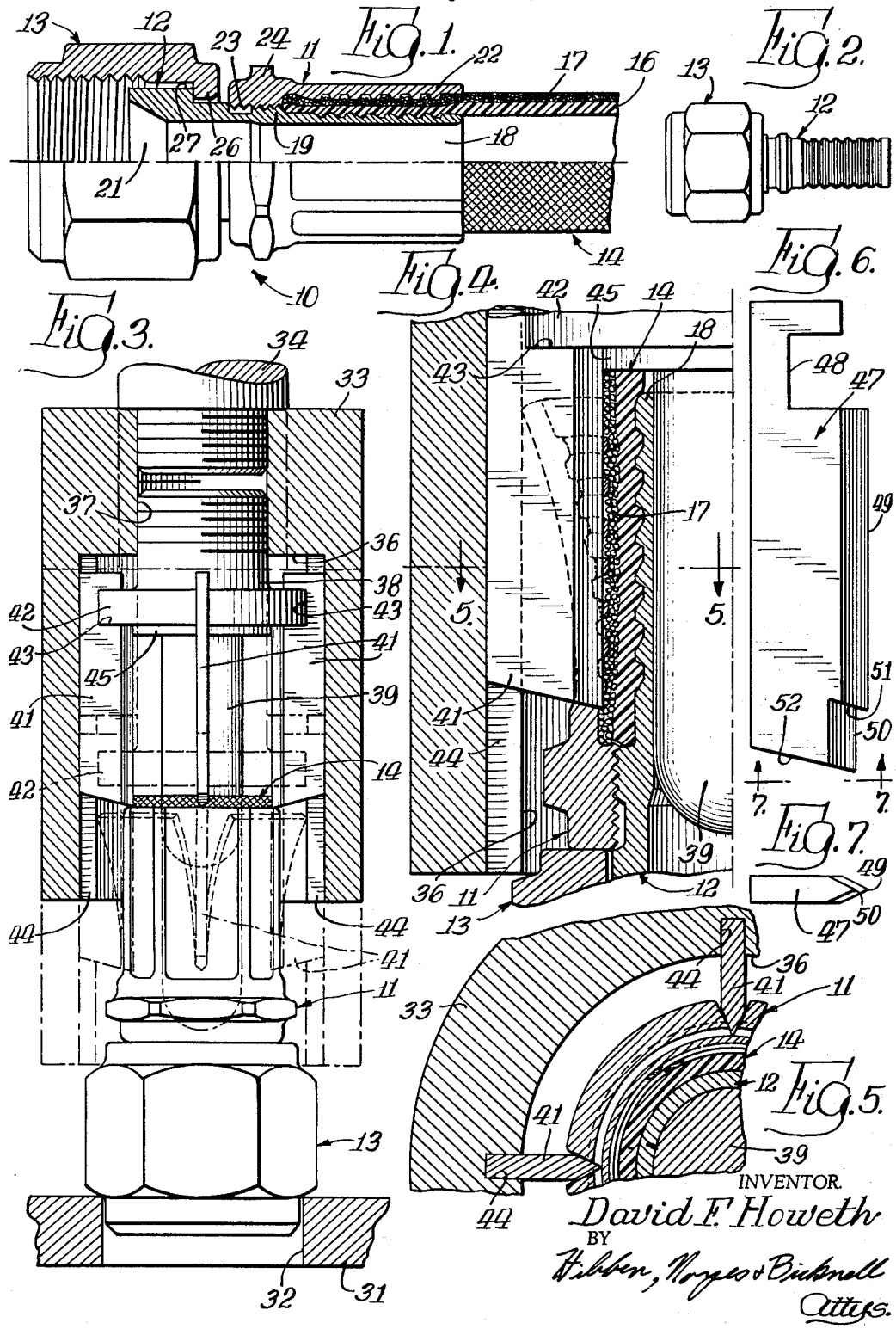

3,247,587
Patented Apr. 26, 1966

3,247,587
APPARATUS FOR SLITTING
David F. Howeth, Fort Worth, Tex., assignor to Stratoflex,
Inc., Fort Worth, Tex., a corporation of Texas
Filed Apr. 17, 1963, Ser. No. 273,741
9 Claims. (Cl. 29—235)

This invention relates generally to hose fittings and, more particularly, to apparatus for disassembling a crimped or swaged hose fitting.

A common type of industrial fitting comprises a socket and a nipple which are threaded together. To obtain what is known in the trade as a "permanent" connection between the fitting and a length of hose, an end of the hose is inserted between the nipple and the socket and the hose is compressed between them, usually by crimping or swaging the socket to reduce its diameter.

The compressive force on the hose makes removal of the hose from the fitting and disassembly of the fitting very difficult, and the entire assembly is usually thrown away when, for example, the hose is damaged, even though portions of the fitting may not be damaged. When the fitting is an expensive type, such as an elbow fitting, a swivel fitting or a large straight fitting, it is obvious that an apparatus for disassembling the hose and the fitting so that portions of the fitting, such as the nipple, may be salvaged would be advantageous.

Accordingly, it is the primary object of this invention to provide a novel apparatus for disassembling a hose and a fitting, without damaging portions of the fitting to be salvaged.

Other objects and advantages of the invention will become apparent from the following detailed description taken in conjunction with the accompanying figures of the drawing, in which:

FIG. 1 is a view partially in section of a fitting having a hose secured thereto;

FIG. 2 is a reduced elevational view of a portion of the fitting shown in FIG. 1;

FIG. 3 is a view partially in section of an apparatus embodying the invention and showing an initial step in the disassembly of the hose and fitting;

FIG. 4 is an enlarged fragmentary sectional view of the apparatus, showing a subsequent step;

FIG. 5 is a sectional view taken on the line 5—5 of FIG. 4;

FIG. 6 is an elevational view showing an alternative construction of a portion of the apparatus; and FIG. 7 is a view taken on the line 7—7 of FIG. 6.

In general, apparatus for separating a tubular hose from a crimped or swaged fitting having a nipple and a socket, comprises a fitting retainer and a tool retainer. One of the retainers is held stationary while the other retainer is adapted to be connected to a ram and be moved toward and away from the stationary retainer. The fitting retainer is adapted to receive a fitting with the hose receiving end of the fitting extending outwardly away from the fitting retainer. The tool retainer has secured thereto a plurality of cutting tools which are adapted to cut into the socket upon movement of the two retainers toward each other. The cutting tools are arranged to make longitudinal cuts in the socket at a plurality of angularly spaced locations, after which the portions or sectors of the socket between the cuts buckle outwardly and release the compressive force on the hose. The hose may then be pulled out of the fitting and the socket separated from the nipple.

Preferably, a mandrel is also secured to the tool retainer, which moves into the interior of the nipple prior to the time when the cutting tools first contact the socket. This mandrel is sized to hold or bring the nipple back to its original diameter, and the mandrel also supports the fitting while the socket is being cut.

In the embodiment shown in the drawing, in FIG. 1 there is shown a fitting 10 comprising a shell or socket 11, a nipple 12 and a swivel nut 13. The fitting is shown secured to a flexible tubular hose 14 comprising an inner tube 16 made of rubber or a plastic material, and an outer reinforcement 17 such as wire braid.

The nipple 12 includes a hollow tubular rearward portion 18 adapted to be inserted into the end of the inner tube 16, a threaded portion 19 adapted to be attached to the socket 11, and a forward portion 21 having the swivel nut 13 rotatably attached thereto. The socket 11 includes an annular portion 22 adapted to be positioned around the end of the hose 11, a threaded portion 23 adapted to engage the threaded portion 19 of the nipple 13, and an enlarged portion 24 having external wrench engaging flats formed thereon. The portions 18 and 22 of the nipple 12 and the socket 11 may be provided with a plurality of annular hose engaging ribs on their outer and inner peripheries, respectively. The swivel nut 13 includes an inwardly extending flange 26 for attaching it to the forward end of the nipple 12, this flange 26 fitting loosely between the forward end of the socket 11 and an outwardly extending flange 27 formed on the forward portion 21 of the nipple 12.

The portion of the hose 14 in the opening between the socket 11 and the nipple 12 is held in the fitting by a compressive force produced by reducing the diameter of the rearward annular portion 22 of the socket 11, as by crimping or swaging the portion 22. As shown in FIG. 1, the ribs on the socket and the nipple dig into the hose and prevent the hose from being forced or pulled out of the fitting 10 during use.

While the socket has been distorted from its original condition by the crimping operation, the nipple 12 and the swivel nut 13, which are the most expensive parts of the fitting, are relatively undamaged or distorted. When it is no longer desired to use this hose and fitting combination, the nipple 12 and the swivel nut 13 may be salvaged for future use, in accordance with the invention, by means of the apparatus shown in FIGS. 3 to 7. The fitting shown herein is merely illustrative of one type of fitting of which certain parts may be salvaged. Parts of somewhat different types of fittings may of course be salvaged by apparatus embodying the invention.

The apparatus comprises a fitting retainer 31 (FIG. 3) having a generally circular opening 32 formed in it. This retainer is in the form of a horizontal plate which preferably is held substantially stationary. The diameter of the opening 32 is slightly less than the maximum outer diameter of the swivel nut 13 but greater than the diameter of the forward end of the swivel nut 13, so that the fitting may be supported on the retainer 31 with its hose receiving end extending upwardly away from the retainer 31 by positioning the forward end of the swivel nut 13 within the opening 32. The hose beyond the fitting is of course cut off before the fitting is placed in the fitting retainer. When the fitting 10 is so supported, the weight of the socket 11 and the nipple 12 causes them to move downwardly until the forward end of the socket 11 engages the rearward end of the swivel nut 13.

The purpose of the fitting retainer 31 is simply to support the fitting 10, and fitting retainers in a variety of shapes may be provided in order to accommodate fittings of various types and sizes. The fitting retainer 31 is just one type that may be used with the type of fitting illustrated.

The apparatus further comprises a tool retainer 33 which is adapted to be secured to a ram 34. The tool retainer 33 may be generally cylindrical, and has an opening 36 formed therein which is circular in cross section. The forward portion of the opening 36 is preferably larger in diameter than the maximum cross sectional dimension of the socket 11, so that the retainer 33 may be positioned over the socket 11 as shown in FIG. 4. To secure the retainer 33 to the ram 34, the rearward portion 37 of the opening 36 and the forward end of the ram 34 may be threaded and connected together. If desired, other means may be provided for connecting the tool retainer 33 to the ram 34.

A mandrel 38, which is preferably circular in cross section, is positioned coaxially with and within the opening 36 of the retainer 33, and the rearward portion of the mandrel 38 is threaded into the rearward portion 37 of the opening 36. The diameter of the forward portion 39 of the mandrel 38 is preferably equal to the internal diameter of the nipple 12 before the crimping operation, and the forward end of the mandrel 38 is preferably rounded so that the portion 39 of the mandrel will be guided into the nipple 12 during the operation of the apparatus, as will be discussed hereinafter.

A plurality of cutting tools 41 for cutting the socket 11 are attached to the mandrel 38 by means of a radially outward extending flange 42 located between the forward and rearward portions of the mandrel 38. Each cutting tool 51 is a longitudinally extending blade-like member, and the plane of each tool 41 is preferably coincident with a radial line emanating from the axis of the mandrel 38. Each tool 41 is provided with a slot 43 (FIGS. 3 and 4) which is positioned over the flange 42 of the mandrel, the tools 41 thereby being held against longitudinal movement relative to the mandrel 38. Since the flange 42 is circular in cross section, the tools 41 may move circumferentially relative to the mandrel 38. Circumferential movement of the tools relative to the tool retainer 33 is prevented during operation of the apparatus however, by positioning the outer edge of each cutting tool within a longitudinally extending groove 44 (FIGS. 4 and 5) formed on the inner periphery of the tool retainer 33. In this instance, four grooves 44 are provided, at 90° intervals, and a corresponding number of cutting tools 41 are also provided. A shoulder 45 is also formed on the mandrel 38 between the flange 42 and the forward portion 39. The shoulder 45 has a smaller diameter than the flange 42, and the inner edges of the tools 41 rest on the periphery of the shoulder 45, the shoulder 45 thereby preventing the forward portions of the tools from swinging inwardly.

It will be apparent that the cutting tools 41 may move longitudinally but not circumferentially relative to the retainer 33, and that the mandrel 38 may move rotatively but not longitudinally relative to the tools 41. This permits the cutting tools 41 and the mandrel 38 to be assembled with the tool retainer 33 by positioning the flange 42 of the mandrel 38 within the slots 43 of the cutting tools 41 and positioning the rearward end of the cutting tools 41 within the slots 44 of the tool retainer 33. The mandrel 38 and the tools 41 are then moved longitudinally into the retainer 33 and the mandrel 38 is threaded into the rearward portion 37 of the opening 36 of the retainer 33. The apparatus may be disassembled by reversing the above procedure.

As shown in FIGS. 4 and 5, the inner longitudinal edge of each cutting tool is provided with a sharp V-shaped cutting edge which extends from its forward end rearwardly to the flange 42 of the mandrel 38. The forward end of each tool is preferably blunt and it also preferably tapers rearwardly as shown in FIG. 4. These tools 41 are of course formed of a material which is considerably harder than the material of the socket 11 so that the tools 41 are capable of cutting into the socket 11 when sufficient force is applied.

In operation, the hose 14 is first cut off relatively close to the fitting, and the forward end of the swivel nut 13 is positioned within the opening 32 of the fitting retainer 31. The tool retainer 33 is then moved downwardly over the fitting 10. As shown in FIG. 3 the forward portion 39 of the mandrel 38 engages the fitting first and is forced into the nipple 12 prior to the time when the cutting tools 41 engage the socket 11. The mandrel 38 provides additional support for the fitting 10 during the cutting operation and it is preferably sized to expand the nipple 12 to bring its internal diameter back to a predetermined size if necessary.

The dimensions of the apparatus are such that the forward ends of the tools 41 engage the rearward end of the socket 11 and make longitudinal cuts in the socket as the tool retainer 33 is forced forwardly by the ram 34. The length of the cuts is controlled, in this instance, by controlling the length of the stroke of the ram 34. The length of cut could also be controlled by having the tool retainer 33 engage the fitting retainer 31 when the desired length of cut is obtained.

The apparatus may be dimensioned to cut radially entirely through the socket 11 or nearly all the way through, the latter instance being shown in the drawing. As shown in FIG. 4, the tools 41 cut approximately one-half way through the ribs on the socket, and internal pressure breaks the remaining relatively thin strips of metal. The internal pressure may be due to the natural tendency of the nipple and the hose to spring or flex outwardly, and also the outward force due to expansion by the mandrel 39. By this method, the socket may be cut without having to sever the wire reinforcement 17 of the hose 14, thus avoiding wear on the tools.

The length of cut is preferably such that the cuts extend substantially to the forward end of the hose 14, that is, for the length of the crimped portion of the fitting. The shape of the cutting tools 41 and the internal pressure cause the sectors of the socket between the cuts to flare or buckle outwardly away from the hose 14, as shown in dashed lines in FIGS. 3 and 4. After the cutting operation, the ram 34 and the tool retainer 33 are moved rearwardly away from the fitting retainer 31. The fitting 10 is then removed from the tool retainer 33. The hose 14 is then gripped by suitable means, such as a pair of pliers, and pulled out of the fitting, and, thereafter, the socket 11 is threaded off of the nipple 12. In some instances it may be necessary to flare the sectors of the socket 11 outwardly an additional amount before the hose 14 can readily be pulled out. This may be accomplished manually with pliers once the socket is cut in the manner described.

It should be apparent that the apparatus may also be operated by holding the tool retainer 33 stationary and connecting a ram to the fitting retainer 31 and forcing a fitting into the tool retainer.

In FIGS. 6 and 7 is shown an alternative construction of the cutting tools wherein the forward end of the tool has a stepped configuration. This cutting tool, indicated by the numeral 47, is provided with a slot 48 for attachment to the mandrel 38 and a cutting edge 49 similar to the tool 41. The forward end of the tool 47 is stepped outwardly to provide a cutting edge 50 spaced radially outward from the cutting edge 49, the tool tapering rearwardly at 51 from the edge 49 and tapering rearwardly at 52 from the edge 50. Both portions 51 and 52 are preferably blunt.

When the tool shown in FIGS. 6 and 7 is used, the outer portion 52 first engages the socket and cuts approximately one-half way through it, and the inner portion 51 of the tool 47 next engages the socket and cuts the remainder of the distance. Two cuts are thereby obtained with one stroke of the ram 34.

From the foregoing it is apparent that a useful apparatus has been provided for salvaging portions of a crimped or swaged fitting. In a single stroke of the apparatus, the socket is cut sufficiently to make disassembly possible and the nipple is also returned to its original dimensions.

I claim:

1. Apparatus for salvaging part of a fitting which includes a socket and a nipple, the fitting having been secured to a hose by compressing the socket and the hose, said apparatus comprising a fitting retainer for supporting a fitting with the rearward end of the fitting extending outwardly away from said fitting retainer, a hollow tool retainer positioned adjacent said fitting retainer, one of said retainers being adapted to be secured to a ram for moving it toward and away from the other of said retainers, said movement being parallel to the longitudinal axis of the fitting, at least one cutting tool secured within said tool retainer, said cutting tool being positioned to make a longitudinal cut in the socket of the fitting when said retainers are moved toward each other, said cut releasing the compressive force on the hose so that the hose may be removed from the fitting, after which the nipple may be separated from the socket, and a mandrel secured to said tool retainer, said mandrel being sized to extend into the nipple of the fitting and assist in supporting the fitting against inward pressure of said tool while the socket is being cut.

2. Apparatus as in claim 1, wherein said mandrel has a predetermined size and is adapted to expand the nipple to said predetermined size.

3. Apparatus as in claim 2, wherein the forward end of said mandrel is spaced forwardly of the forward end of said tool so that said mandrel extends into said nipple before said tool engages said socket.

4. Apparatus for salvaging part of a fitting which includes a socket and a nipple, the fitting having been secured to a hose by compressing the socket and the hose, said apparatus comprising a fitting retainer for supporting a fitting with the rearward end of the fitting extending outwardly away from said fitting retainer, a hollow tool retainer positioned adjacent said fitting retainer, one of said retainers being adapted to be secured to a ram for moving it toward and away from the other of said retainers, said movement being parallel to the longitudinal axis of the fitting, at least one cutting tool secured within said tool retainer, said cutting tool being positioned to make a longitudinal cut in the socket of the fitting when said retainers are moved toward each other, said cut releasing the compressive force on the hose so that the hose may be removed from the fitting, after which the nipple may be separated from the socket, said cutting tool comprising a blade having a sharp cutting edge on one longitudinal edge, said one edge being positioned to cut into the socket when said tool and fitting retainers are moved toward each other, and the forward end of said blade tapering rearwardly away from said cutting edge.

5. Apparatus for salvaging part of a fitting which includes a socket and a nipple, the fitting having been secured to a hose by compressing the socket and the hose, said apparatus comprising a fitting retainer for supporting a fitting with the rearward end of the fitting extending outwardly away from said fitting retainer, a hollow tool retainer positioned adjacent said fitting retainer, one of said retainers being adapted to be secured to a ram for moving it toward and away from the other of said retainers, said movement being parallel to the longitudinal axis of the fitting, at least one cutting tool secured within said tool retainer, said cutting tool being positioned to make a longitudinal cut in the socket of the fitting when said retainers are moved toward each other, said cut releasing the compressive force on the hose so that the hose may be removed from the fitting, after which the nipple may be separated from the socket, said cutting tool comprising a blade having a sharp cutting edge on one longitudinal edge, said one edge being positioned to cut into the socket when said tool and fitting retainers are moved toward each other, the forward end of said blade having a step configuration, and said forward end having a cutting edge spaced outwardly from said first-mentioned cutting edge.

6. Apparatus as in claim 5, wherein said forward end of said blade and the step therein taper rearwardly away from the respective cutting edges.

7. Apparatus for salvaging part of a fitting which includes a socket and a nipple, the fitting having been secured to a hose by compressing the socket and the hose, said apparatus comprising a fitting retainer for supporting a fitting with the rearward end of the fitting extending outwardly away from said fitting retainer, a hollow tool retainer positioned adjacent said fitting retainer, one of said retainers being adapted to be secured to a ram for moving it toward and away from the other of said retainers, said movement being parallel to the longitudinal axis of the fitting, at least one cutting tool secured within said tool retainer, said cutting tool being positioned to make a longitudinal cut in the socket of the fitting when said retainers are moved toward each other, said cut releasing the compressive force on the hose so that the hose may be removed from the fitting, after which the nipple may be separated from the socket, said tool retainer being hollow and generally cylindrical, and further including a generally cylindrical mandrel positioned coaxially within said tool retainer, and a plurality of said cutting tools are provided which are attached to said mandrel.

8. Apparatus as in claim 7, wherein said cutting tools are rotatively attached to said mandrel, and said tool retainer includes on its inner periphery means for preventing rotative movement of said cutting tools relative to said tool retainer.

9. Apparatus as in claim 8, wherein said mandrel is threaded to said tool retainer, and said cutting tools are attached to said mandrel such that said mandrel may move rotatively relative to said cutting tools, the latter being held against longitudinal movement relative to said mandrel.

References Cited by the Examiner

UNITED STATES PATENTS

| 2,093,022 | 9/1937 | Olsen | 30—272 |
| 2,411,246 | 11/1946 | Clapper | 30—168 X |
| 2,836,888 | 6/1958 | Hargrove | 30—272 |
| 2,853,723 | 9/1958 | Winslow | 30—168 X |
| 3,000,097 | 9/1961 | Hartz | 30—277 X |

WILLIAM FELDMAN, *Primary Examiner.*

MYRON C. KRUSE, *Examiner.*